United States Patent [19]
Presz, Jr.

[11] Patent Number: 5,761,900
[45] Date of Patent: Jun. 9, 1998

[54] TWO-STAGE MIXER EJECTOR SUPPRESSOR

[75] Inventor: Walter M. Presz, Jr., Wilbraham, Mass.

[73] Assignee: Stage III Technologies, L.C., La Jolla, Calif.

[21] Appl. No.: 729,571

[22] Filed: Oct. 11, 1996

Related U.S. Application Data

[60] Provisional application No. 60/005,437, Oct. 11, 1995.

[51] Int. Cl.$^6$ .............................. F02K 1/38; F02K 3/02
[52] U.S. Cl. .................... 60/262; 60/226.2; 60/277; 239/265.17; 239/265.37
[58] Field of Search ................... 60/226.2, 267, 60/271; 239/265.17, 265.19, 265.37, 265.33

[56] References Cited

U.S. PATENT DOCUMENTS

| | | |
|---|---|---|
| 2,588,532 | 3/1952 | Johnson ........................... 60/262 |
| 3,020,712 | 2/1962 | Dolliver . |
| 3,113,428 | 12/1963 | Colley et al. . |
| 3,174,282 | 3/1965 | Harrison . |
| 3,333,772 | 8/1967 | Bruner . |
| 3,463,402 | 8/1969 | Langston, Jr. ................. 239/265.17 |
| 3,568,794 | 3/1971 | Hilbig . |
| 3,579,993 | 5/1971 | Tanner et al. . |
| 3,613,826 | 10/1971 | Cabassut . |
| 3,673,803 | 7/1972 | MacDonald . |
| 3,696,617 | 10/1972 | Ellis . |
| 3,749,316 | 7/1973 | Tontini . |
| 3,889,882 | 6/1975 | Hull, Jr. et al. . |
| 3,910,375 | 10/1975 | Hache et al. . |
| 3,927,522 | 12/1975 | Bryce et al. . |
| 3,990,530 | 11/1976 | Helfich et al. . |
| 4,077,206 | 3/1978 | Ayyagari ........................... 60/262 |
| 4,117,671 | 10/1978 | Neal et al. . |
| 4,291,782 | 9/1981 | Klees . |
| 4,302,934 | 12/1981 | Wynosky et al. . |
| 4,353,516 | 10/1982 | Soligny et al. . |
| 4,422,524 | 12/1983 | Osborn . |
| 4,487,017 | 12/1984 | Rodgers . |
| 4,501,393 | 2/1985 | Klees et al. . |
| 4,543,784 | 10/1985 | Kirker . |
| 4,548,034 | 10/1985 | Maguire . |
| 4,576,002 | 3/1986 | Mavrocostas . |
| 4,813,230 | 3/1989 | Braithewaite ..................... 60/262 |
| 4,835,961 | 6/1989 | Presz, Jr. et al. . |
| 4,909,346 | 3/1990 | Torkelson ......................... 60/262 |
| 4,934,481 | 6/1990 | Friedrich . |
| 5,127,602 | 7/1992 | Batey et al. . |
| 5,157,916 | 10/1992 | Wynosky et al. . |
| 5,216,879 | 6/1993 | Zysmaan ........................... 60/262 |
| 5,291,672 | 3/1994 | Brown . |
| 5,440,875 | 8/1995 | Torkelson et al. . |

FOREIGN PATENT DOCUMENTS

| | | |
|---|---|---|
| 1176983 | 12/1958 | France . |
| 836175 | 5/1958 | United Kingdom . |
| 1170809 | 9/1967 | United Kingdom . |

*Primary Examiner*—Charles G. Freay
*Attorney, Agent, or Firm*—Donald S. Holland, Esq.; Holland & Bonzagni, P.C.

[57] ABSTRACT

A two-stage mixer ejector concept ("TSMEC") is disclosed for suppressing the noise emanated by jet aircraft. This TSMEC was designed to help older engines meet the stringent new federal noise regulations, known as "Stage III". In an illustrated embodiment, the TSMEC comprises: a lobed engine nozzle attached to the rear of a turbofan engine; a short shroud that straddles the exit end of the engine nozzle; two rings of convergent/divergent primary and secondary lobes within the engine nozzle shroud and; a ring of arcuate gaps that precede the shroud and the second nozzle ring. The lobes are complimentary shaped to rapidly mix the turbine's hot exhaust flow with cooler air including entrained ambient air, at supersonic speed. This drastically reduces the jet exhaust's velocity and increases jet mixing, thereby reducing the jet noise.

11 Claims, 4 Drawing Sheets

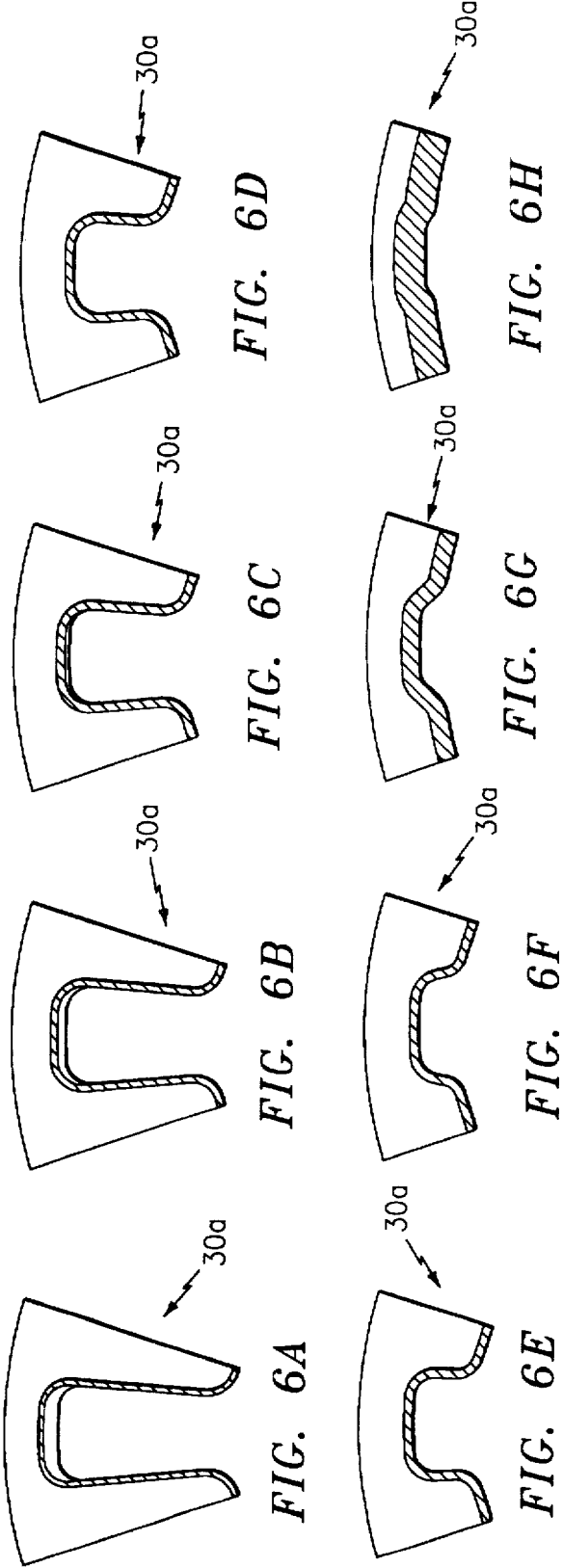

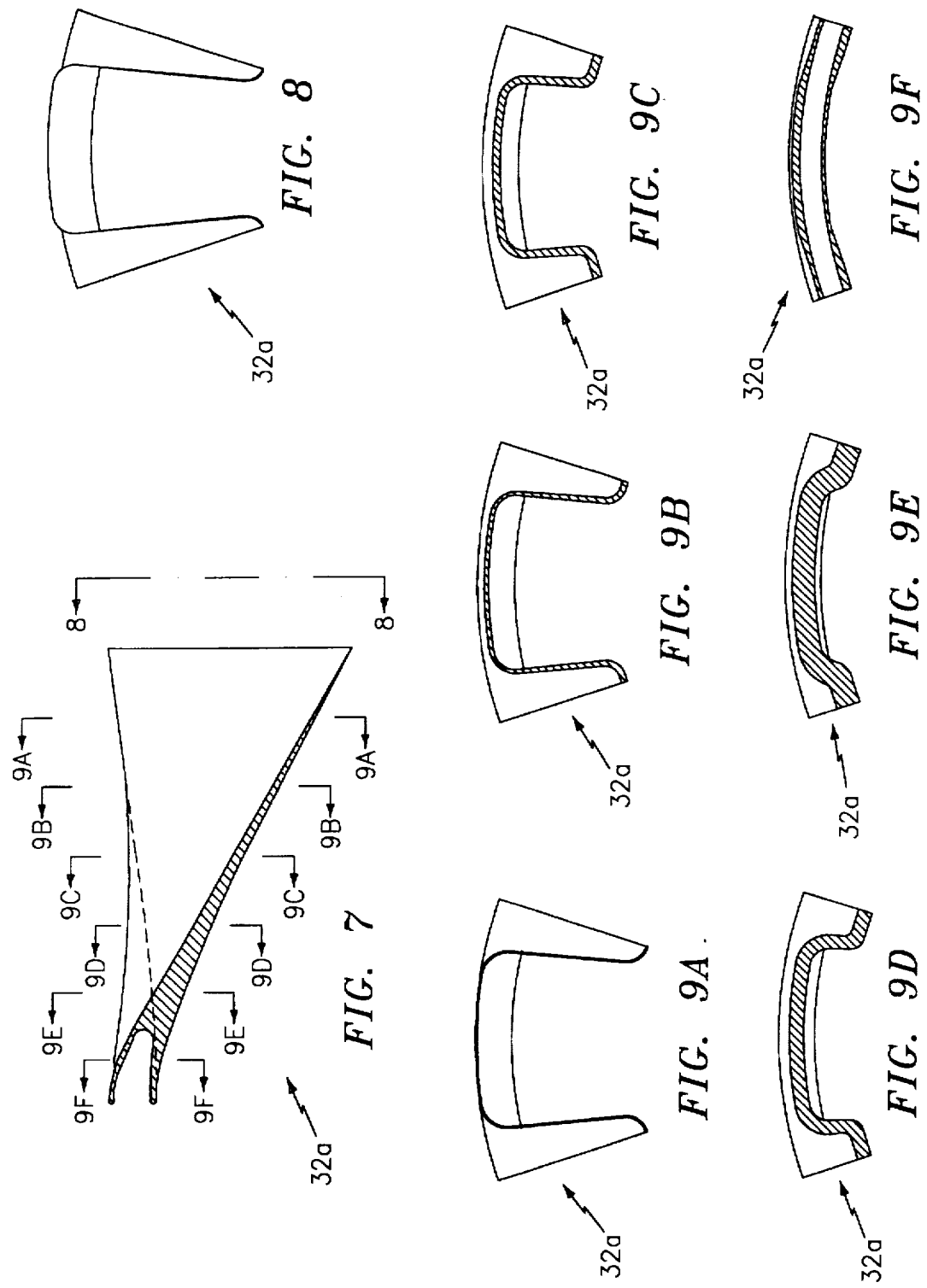

TWO-STAGE MIXER EJECTOR SUPPRESSOR

BACKGROUND OF THE INVENTION

This "regular" patent application is based upon a "provisional" patent application, entitled "TWO STAGE MIXER SUPPRESSER (sic.) DESIGNS", application Ser. No. 60/005,437, filed Oct. 11, 1995 by the same inventor.

This invention relates to jet aircraft. More particularly, it deals with noise suppressors that are attached to the aircraft's gas-turbine engines.

Jet noise is created by the exhaust gases, that emanate from the rear of a modern gas turbine. These exhaust gases are typically a mixture of two sources—the hot gasses resulting from the burnt fuel within the turbine's core flow and cooler air discharged from fan bypass ducts. In low bypass ratio jet engines, the gases usually mix before they exit the engine nozzle, where they form a high-speed plume. The plume rips or shears against the slower ambient air, as it rushes by.

While the shearing creates noise, it has been recognized that the dominant factor in the overall noise level is the speed of the hot core flow. Jet noise is a factor of the core speed to the seventh power. For example, if the core speed could be cut in half, the noise would be reduced to $1/128$ of its prior level.

Several methods have been utilized in the past to decrease the speed of the core flow, and hence lower the noise or decibel levels caused by the craft. For example, U.S. Pat. No. 4,835,961 to Walter M. Presz, Jr. et al. discloses an ejector mounted atop the tail of a gas turbine. Ambient air is drawn, through an annular gap, into the ejector by entrainment. A ring of mixing lobes mixes air downstream with the turbine's exhaust plume, inside the ejector. This results in lower velocities, and lower jet noise levels.

The problem with conventional ejectors is that they perform well below ideal predictions. The key factor is jet mixing. A jet normally mixes with a spread angle of about five degrees. Long mixing ducts, with the length-to-diameter ratios ("L/D") greater than ten, are required to obtain complete mixing. These long ducts result in large friction losses and poor ejector performance. The long ducts also result in large weight increases, and poor cruise performance.

Applicant has compiled baseline data for conventional ejectors. That data shows that short ejector ducts result in virtually no mixing, and poor pumping results. Long duct lengths are required for reasonable flow mixing. The long ducts result in large wall friction losses, and again poor pumping performance. A means of increasing mixing rates without large losses is needed to improve ejector performance.

New stringent federal noise regulations (ie., "Stage III") will soon prohibit most older aircraft from landing in suburban airports. These older aircraft are usually powered by low bypass ratio turbofan engines. Such engines have extremely high jet velocities, with relatively high jet noise. However, their noise levels have been governed by more lenient regulations, known as "Stage II".

In order for such older engines to meet the new noise standards, conventional ejectors would have to be lengthened. That would increase the overall weight of the engine, and might even make some of the older aircraft unflyable.

Newer jet engines have high bypass ratios. This means that they have much larger fan flows, and overall larger total engine flow rates. A large fraction of the energy obtained through burning fuel in the core system is used to drive a fan and pump more flow. Thrust is obtained through larger mass flow rates, and lower jet velocities. This results in much lower jet noise levels.

Accordingly, it is a primary object of the present invention to provide a multi-stage mixer ejector system that decreases the noise levels of older engines, within short shrouds, to meet the new Stage III noise regulations.

It is another object of the present invention to provide an ejector with two stage mixers. They have primary and secondary mixing lobes that are specifically designed to complement each other in rapidly mixing ambient air with the engine exhaust gases, thereby shortening the length required to obtain the desired mixing.

It is yet another object to provide a two-stage mixer ejector suppressor, commensurate with the above-listed objects, that will increase the engine's effective thrust.

The above and other objects will become more readily apparent when the following descriptions are read in conjunction with the accompanying drawings.

SUMMARY OF THE INVENTION

A two-stage mixer ejector suppressor is disclosed for greatly reducing the noise level of gas turbines. In the preferred embodiment, two suppressor stages are located end-to-end within an ejector shroud. Each stage has a ring of multiple convergent/divergent lobes or curved stator vanes; and the second stage is preceded by a ring of arcuate gaps that permit ambient air to be sucked into the ejector shroud. The two stator rings are specifically designed to complement each other in rapidly mixing the ambient air with the engine exhaust gases. Each ring mixes the flows within its lobes while directing both: hot and high velocity air out toward the shroud walls, and cold and low velocity air toward the shroud centerline. This phenomena has been measured on recent model tests of similar lobes, by the Applicant. The lobes are designed to rapidly mix the high velocity flow near the shroud wall with ambient air, at supersonic flow speeds. These same lobes increase the spread rate of the exhaust jet, dissipate its velocity and greatly decrease the core length of the exhaust jet. Hence, noise levels are reduced, as well as the length of the typical shroud, found in prior art.

BRIEF DESCRIPTION OF THE DRAWINGS

FIG. 4 shows one of the identical lobes in a primary stator ring of a first stage in the TSMEC;

FIG. 5 is an end plan view of the FIG. 4 lobe, taken along line 5—5;

FIGS. 6A–6H are various cross-sectional views of the FIG. 4 lobe;

FIG. 7 shows one of the lobes in a secondary stator ring of a second stage in the TSMEC;

FIG. 8 is an end plan view of the FIG. 7 lobe taken along line 8—8;

FIGS. 9A–9F show various cross-sectional views of the FIG. 7 lobe; and

DETAILED DESCRIPTION OF THE PREFERRED EMBODIMENTS

Figure 1:
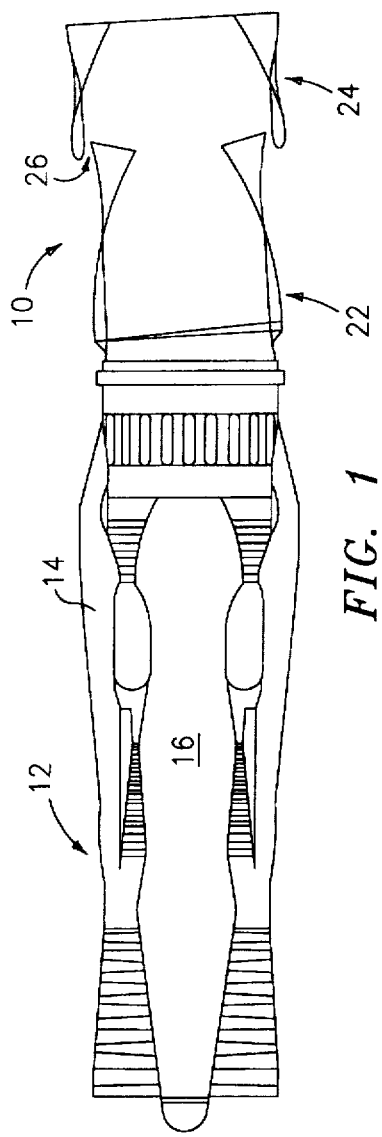
FIG. 1. is a side-elevational view of a two-stage mixer ejector concept ("TSMEC"), constructed in accordance with the present invention, attached to a SPEY 511-8 engine.

Referring to the drawings in detail, FIGS. 1–9 illustrate a two-stage mixer ejector concept ("TSMEC") for suppressing the noise from jet aircraft. The TSMEC is generally designated by the reference numeral 10.

Though the TSMEC invention is designed to work with all modern gas turbines, the illustrated embodiment 10 is shown attached to a SPEY 511-8 turbofan engine 12. The SPEY 511-8 includes: a fan bypass duct 14; and a central core flow 16 in which the engine fuel ignites. Flow streams from the fan duct 14 and central core 16 mix slightly forming exhaust streams. The exhaust streams then exit the rear of the turbofan 12. There, they pass through the TSMEC 10.

In the preferred embodiment, the TSMEC 10 comprises a combined engine tailpipe and lobed nozzle 18 attached to the rear of the turbofan 12; a tubular ejector shroud 20 attached to the engine nozzle 18, where it straddles the nozzle's exit end; first and second lobe mixer stages 22, 24 within the engine nozzle 18 and shroud 20; a ring 26 of arcuate gaps (e.g., 26a) preceding the ejector shroud 20; and a primary ring 30 of identical convergent/divergent stationary nozzles or mixing lobes (e.g., 30a), ending inside the first ejector stage 22, that direct entrained ambient air at supersonic speed to a complementary second ring 32 of convergent/divergent mixer lobes (e.g., 32a) inside the second ejector stage 24.

The TSMEC exhaust suppressor 10 was designed to be the same length as prior Stage II suppressors, or shorter. It can be attached to the rear of turbofan 12 by any suitable means, such as welding of a annular flange 34 (see FIG. 2). The shroud 20 contains a standard support ring 36, found on prior Stage II shrouds, for structural stability.

Immediately downstream of support ring 36 is the primary nozzle ring 30. It is attached to the interior wall of the shroud by any suitable means, such as welding.

Though not shown in its entirety (for the sake of simplicity), the primary nozzle ring 30 consists of ten canted, convergent/divergent ("CD") lobes. One representative primary lobe is, however, shown at 30a in FIGS. 4, 5 and 6A–6H. Each primary lobe's angles (ie., with respect to the horizontal direction) on the secondary flow side (i.e., the lobe side toward the centerline of the nozzle that carries the cool fan air) should be between fifteen degrees and forty-five degrees. This assures penetration of the cool secondary flow (i.e., fan air) into the hot primary flow (i.e., exhaust core flow) near the nozzle centerline. The lobe angles on the primary flow side (i.e., the lobe side toward the shroud that carries the hot core flow 16) should be between five degrees and fifteen degrees. These lower angles minimize the thrust loss due to flow divergents. These profile guidelines assure very little extra surface area when compared to that of a conventional round nozzle. The lobed nozzle exit plane should be cut back at an angle between five degrees and twenty degrees. This cut-back provides an aerodynamic CD lobed nozzle for the flow to locally expand supersonically to the shroud pressure. Most of this expansion will occur as the flow exits the lobe. In this manner, the high velocity expanded core flow will mix quickly with fan air, reducing any overexpansion outside the primary nozzle ring.

The ejector shroud 20 is extremely short, as a result of new ejector performance. It should have a length-to-diameter ratio (i.e., L/D) of between one-quarter and one, and should operate at a pumping rate near eighty percent of ideal. The shroud trailing edge also is flush with the trailing edge of a ten lobed forced mixer, i.e., the secondary mixer lobe ring 32 mentioned above. These secondary lobes are identical, with one representative lobe being shown at 32a in FIGS. 7, 8 and 9A–9F. Their job is to quickly mix the previously combined streams of core and fan flows with ambient entrained air (sucked in through arcuate gaps such as 26a), at supersonic speed, prior to the streams discharging from the shroud.

Figure 3:
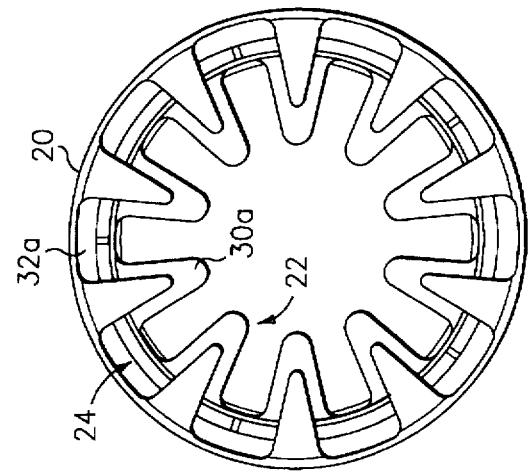
FIG. 3 is a rear-end plan view, taken along line 3—3 of FIG. 2.
Figure 2:
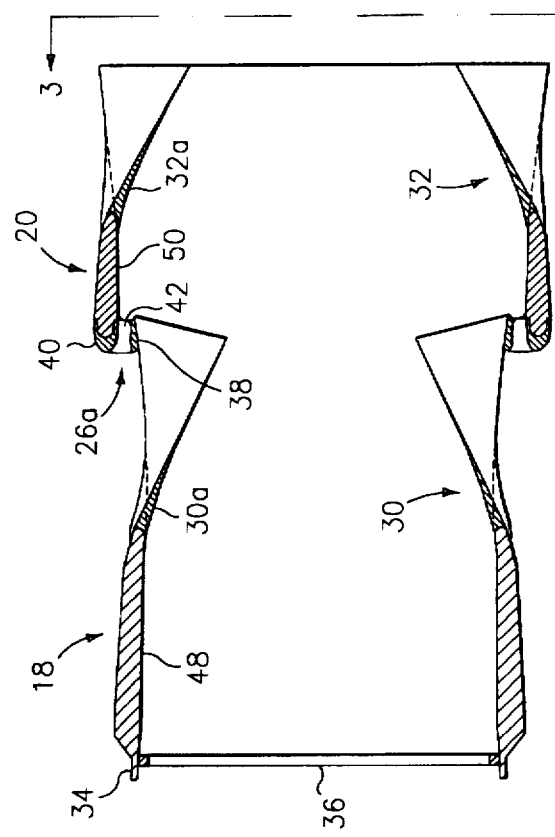
FIG. 2 is an enlarged view of the TSMEC, shown in FIG. 1.

As best shown in FIGS. 2 and 3, the second lobe ring 32 is located radially outwardly from the centerline of the primary nozzle ring 30. The second ring is supported in this position by: a lower or foot ring 38; an upper ring 40; and a series of spaced struts 42 that define the gaps (e.g., 26) for sucking in ambient air.

From the above-listed information, routineers should realize that the primary and secondary lobed nozzles (e.g., 30a, 32a) are designed in a similar fashion to form a supersonic two-stage mixer system. The two lobe rings 30, 32 are specifically designed to complement each other in rapidly mixing ambient air with the engine exhaust gases. The primary ring 30 mixes the flows within its lobes while directing both: hot and high velocity air out toward the shroud walls, and cold and low velocity air toward the shroud centerline. This phenomenon has been measured on recent model tests of similar lobes. The lobes (e.g., 30a, 32a) are designed to rapidly mix the high velocity flow near the shroud wall with ambient air. These same lobes will increase the mixing of the exhaust jet, create an outer doughnut-like jacket around the core to produce a less turbulent flow, and greatly decrease the core length of the exhaust jet.

The engine nozzle 18 and shroud 20 can both start with sheet metal portions 48, 50 with acoustical linings. As best shown in FIGS. 2, 4, and 7, the lobe rings 30, 32 can be separately made of sheet metal and attached to the portions 48, 50.

In short, the TSMEC suppressor system 10 will pull in ambient air, rapidly mix the ambient air with engine gases, increase the exhaust jet spread rate and dramatically reduce exhaust jet noise.

Figure 10:
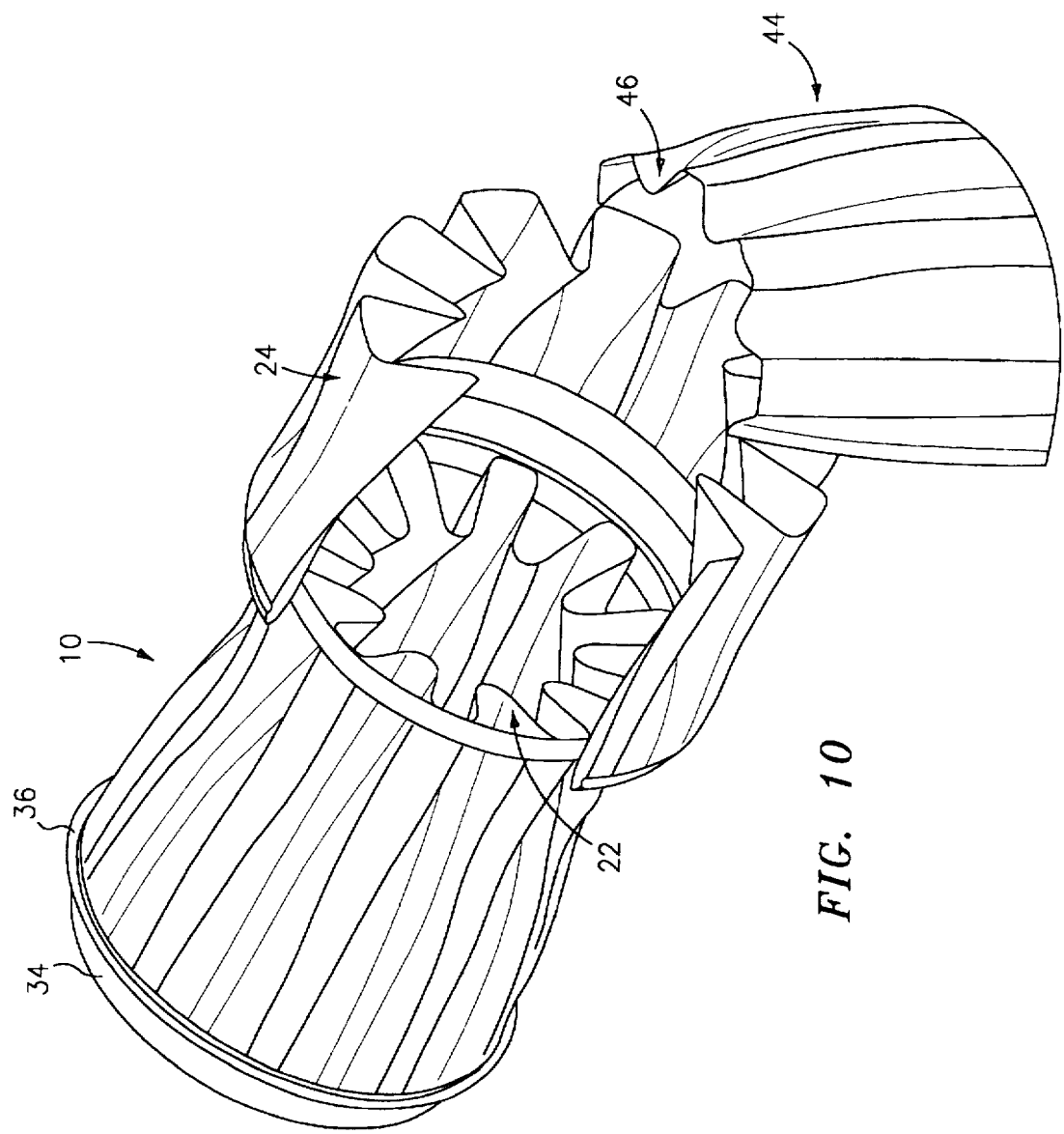
FIG. 10 shows an alternate embodiment of the two-stage suppressor, with a lobed thrust reverser, collectively referred to as a two-stage ejector mixer concept ("TSMEC").

FIG. 10 discloses an alternate embodiment of the TSMEC 10. This comprises a lobed thrust reverser 44, used in conjunction with a variant of the TSMEC 10 shown in FIGS. 1–9. The reverser has a series of lobes or clam shells 46 that are identically shaped to the primary lobes (e.g., 30a) in the TSMEC. Their purpose is to crisply direct the discharged exhaust from the TSMEC, while further silencing it.

The reverser's clam shells 46 have been corrugated to smoothly blend into the primary nozzle surfaces of lobe ring 30 when stowed. This new clam-shell design will not affect the conventional linkage, loads or actuation of the reverser 44.

It should be readily understood by those skilled in the art that obvious structural modifications can be made to the illustrated embodiments without departing from the spirit of the invention. For example, a second shroud could be added (with additional "supersonic" lobe rings preceded by air gaps) if further noise suppression were desired. Accordingly, reference should be made to the accompanying claims, rather than the foregoing specification, to determine the scope of the invention.

Having thus described the invention, what is claimed is:

1. In a gas turbine of the type having engine exhaust gases that can create jet noise, the improvement comprising a multi-stage mixer that suppresses the jet noise, said mixer comprising:

a. a first mixer stage having a tubular engine nozzle attached to an exhaust end of the turbine;

b. a second mixer stage having a tubular ejector shroud attached downstream to a discharge end of the engine nozzle, wherein the shroud straddles the nozzle's discharge end with arcuate gaps between the shroud and the nozzle's discharge end; and c. supersonic mixing means to mix the engine exhaust gases with cooler amibient air, pulled in through the gaps, at supersonic flow speeds, to increase spread rate of the exhaust gases, to dissipate velocity of the exhaust gasses, and to decrease core length of an exhaust jet, compared to the spread rate velocity and core length previously associated with the gas turbine without the multi-stage mixer, thereby reducing noise levels previously associated with the gas turbine without the multi-stage mixer, prior to the exhaust gases exiting the shroud, said means comprising:

(i) a primary stator ring of curved primary lobes within the first mixer stage, attached to the engine nozzle;

(ii) a secondary stator ring of complimentary shaped secondary lobes within the second mixer stage, attached to the shroud; and (iii) wherein the primary lobes end adjacent to the secondary lobes and the primary and secondary lobes are shaped in a convergent/divergent manner to achieve the supersonic mixing.

2. The multi-stage mixer of claim 1 wherein the primary lobes end in the first mixer stage; and the secondary lobes end in the second mixer stage, at a trailing edge of the ejector shroud.

3. The multi-stage mixer of claim 1 wherein the primary ring of lobes guides ambient air into the ejector shroud and mixes the engine exhaust gasses with that ambient air, adjacent and against the shroud, at supersonic speeds.

4. The multi-stage mixer of claim 3 further comprising a lobed thrust reverser, pivotally attached to a trailing edge of the ejector shroud, wherein the thrust reverser has a ring of curved lobes whose profile is identical to the primary ring of lobes in the first ejector stage, whereby exhaust gasses emanating from the shroud are further reduced in velocity and noise.

5. A gas turbofan engine of the type having jet noise created by core exhaust gases and fan bypass air that discharges from the turbofan, the improvement comprising a multi-stage mixer that suppresses the jet noise, said mixer comprising:

a. a first mixer stage having a tubular engine nozzle attached to an exhaust end of the engine;

b. a second mixer stage having a tubular ejector shroud attached downstream to a discharge end of the engine nozzle; and c. supersonic mixing means to mix the core exhaust gases with fan bypass air, at supersonic low speeds, to increase spread rate of the exhaust gases, to dissipate velocity of the exhaust gases, and to decrease core length of an exhaust jet, compared to the spread rate, velocity and core length previously associated with the engine without the multi-stage mixer, thereby reducing noise levels previously associated with the engine without the multi-stage mixer, prior to the exhaust gases and fan bypass air exiting the shroud, said means comprising:

(i) a primary stator ring of curved primary lobes within the first mixer stage, attached to the engine nozzle;

(ii) a secondary stator ring of complementary shaped secondary lobes within the second mixer stage, attached to the shroud; and (iii) wherein the primary lobes end adjacent to the secondary lobes and the primary and secondary lobes are shaped in a convergent/divergent manner to achieve the supersonic mixing.

6. The multi-stage mixer of claim 5 wherein the shroud straddles the nozzle's discharge end with arcuate gaps between the shroud and the nozzle's discharge end, whereby the primary ring of lobes guides ambient air, entrained into the ejector shroud, and mixes the core exhaust gases with the entrained ambient air, adjacent and against the shroud, at supersonic speeds.

7. The multi-stage mixer of claim 6 further comprising a lobed thrust reverser, pivotally attached to a trailing edge of the ejector shroud, wherein the thrust reverser has a ring of curved lobes whose profile is identical to the primary ring of lobes in the first mixer stage, whereby exhaust gases emanating from the shroud are further reduced in velocity and noise.

8. A mixer for suppressing noise created by exhaust gases discharged from a gas turbine, the mixer comprising:

a. at least one annular mixer stage that is adapted to be attached to a discharge end of the turbine; and b. supersonic means to mix the engine exhaust gases with cooler ambient air at supersonic flow speeds to increase spread rate of exhaust gases, to dissipate velocity of the exhaust gases, and to decrease core length of an exhaust jet, compared to the spread rate, velocity and core length previously associated wit the gas turbine without the mixer, thereby reducing noise levels previously associated with the gas turbine without the mixer, prior to the exhaust gases exiting the mixer stage, said means comprising a stator ring of convergent/divergent lobes with non-perpendicular trailing edges relative to a center line of the exhaust gases, within the mixer stage, to achieve the supersonic mixing.

9. The mixer of claim 8 further comprising a tubular ejector shroud attached downstream to a discharge end of the annular mixer stage, wherein: the shroud straddles the mixer stage's discharge end with arcuate gaps between the shroud and the mixer stage's discharge end; a portion of the supersonic means is located within the shroud to mix the engine exhaust gases with cooler ambient air, pulled in through the gaps, to further increase spread rate of the exhaust gases, to further dissipate velocity of exhaust gases, and to further decrease core length of the exhaust jet, thereby reducing noise levels, prior to the exhaust gases exiting the shroud, said portion of the supersonic means comprising a secondary ring of complementary shaped secondary lobes, attached to the shroud; and the primary lobes end adjacent to the secondary lobes and the primary and secondary lobes are both shaped in a convergent/divergent manner to achieve the supersonic mixing.

10. The mixer of claim 9 further comprising a lobed thrust reverser, pivotally attached to a trailing edge of the ejector shroud, wherein the thrust reverser has a ring of curved lobes whose profile is identical to the primary ring of lobes in the first mixer stage, whereby exhaust gases emanating from the shroud are further reduced in velocity and noise.

11. A mixer for suppressing noise created by exhaust gases discharged from a gas turbine, the mixer comprising:

a. at least one annular mixer stage that is adapted to be attached to a discharge end of the turbine.

b. a lobed thrust reverser, pivotally attached to a trailing edge of the first mixer stage; and c. supersonic means to mix the engine exhaust gases with cooler air at supersonic flow speeds to increase spread rate of exhaust gases, to dissipate velocity of the exhaust gases, and to decrease core length of an exhaust jet, compared to the spread rate, velocity and core length previously associated with the gas turbine without the mixer, thereby reducing noise levels previously associated with the gas turbine without the mixer, prior to the exhaust gases exiting the thrust reverser, said means comprising:

(i) a primary stator ring of curved primary lobes within the first mixer stage;

(ii) a secondary stator ring of complementary shaped secondary lobes, adjacent the thrust reverser; and (iii) wherein the primary lobes end adjacent to the secondary lobes and the primary and secondary lobes are shaped in a convergent/divergent manner to achieve the supersonic mixing.

* * * * *